UNITED STATES PATENT OFFICE.

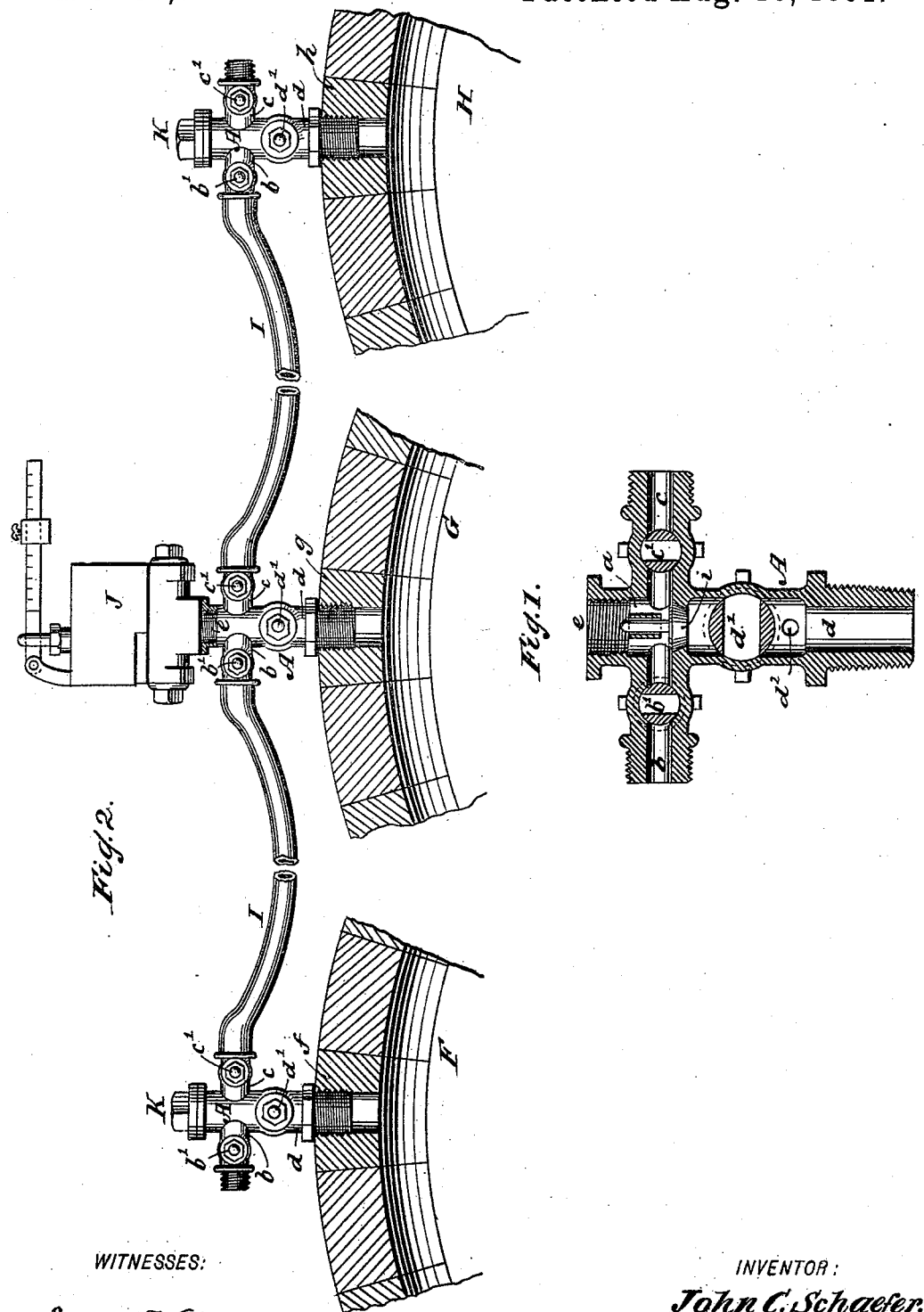

JOHN C. SCHAEFER, OF NEW YORK, N. Y.

DEVICE FOR CONNECTING CASKS AND OTHER VESSELS.

SPECIFICATION forming part of Letters Patent No. 458,072, dated August 18, 1891.

Application filed February 5, 1891. Serial No. 380,378. (No model.)

*To all whom it may concern:*

Be it known that I, JOHN C. SCHAEFER, a citizen of the United States, residing at New York, in the county and State of New York, have invented new and useful Improvements in Devices for Connecting Casks and other Vessels, of which the following is a specification.

This invention consists in a device for connecting casks and other vessels, composed of a valve-chamber, three tubular shanks extending from said valve-chamber, a check-valve between the valve-chamber and one of the tubular shanks, a stop-cock in each of the tubular shanks, and a channel leading into the valve-chamber.

This device is illustrated in the accompanying drawings, in which—

Figure 1 represents a central section of my device. Fig. 2 is a sectional view of three casks connected according to my invention.

In the drawings, the letter A designates the body of my connecting device, which contains the valve-chamber $a$, three tubular shanks $b\ c\ d$, a check-valve $i$ for closing the communication between the valve-chamber $a$ and tubular shank $d$, three stop-cocks $b'\ c'\ d'$, one in each of the tubular shanks, and a channel, $e$, leading into the valve-chamber.

The advantages of my connecting device will be readily understood by referring to Fig. 2. The connecting devices are secured in the bungs $f\ g\ h$ of the various casks F G H, and they are connected with each other by pipes I I. In the channel $e$ of one of the connecting devices is secured a safety-valve J, while the channels $e$ of the remaining connecting devices are closed by plugs K, or the connecting devices may be formed without these channels. If the casks are filled with a fermentable liquid and the pressure in one of the casks rises beyond the desired limit for which the safety-valve J is adjusted, the check-valve $e$ in the connecting device of this cask is lifted and the safety-valve J blows off, while the remaining casks remain closed and the check-valve in the connecting devices of these are not lifted until the pressure in said casks reaches the desired limit. From this description it will be understood that by means of my connecting device I am enabled to control the pressure in a large number of casks with a single safety-valve.

It is obvious that my connecting device can be used with advantage in all cases where a series of vessels containing liquid under pressure are connected to each other and where it is desirable to control the pressure in each individual vessel.

In the tubular shank $d$ below the stop-cock $d'$ is made a hole or channel $d^2$ for the purpose of making connection with an air-pump.

What I claim as new, and desire to secure by Letters Patent, is—

1. A device for connecting casks and other vessels, consisting of a body A, containing a valve-chamber $a$ and having tubular shanks $b\ c\ d$ and a channel $e$, all communicating with the valve-chamber, a check-valve $i$, closing communication between the valve-chamber and the tubular shank which connects with the casing or vessel, a stop-cock in each tubular shank, and a safety blow-off valve J, connected with the said channel of the body above the check-valve, substantially as described.

2. A device for connecting casks and other vessels, composed of a body A, containing a valve-chamber $a$, three tubular shanks $b\ c\ d$, communicating with said valve-chamber, a check-valve $i$ between the valve-chamber and one of the tubular shanks, a stop-cock in each of the tubular shanks, and a channel $e$, leading into the valve-chamber, substantially as described.

In testimony whereof I have hereunto set my hand in the presence of two subscribing witnesses.

JOHN C. SCHAEFER.

Witnesses:
  J. VAN SANTVOORD,
  E. F. KASTENHUBER.